May 8, 1962 W. W. BROUSSARD 3,032,793
SHOE TOOL
Filed Feb. 25, 1957

INVENTOR.
WESLEY WARREN BROUSSARD
BY William E. Kinnear
ATTORNEY

United States Patent Office 3,032,793
Patented May 8, 1962

3,032,793
SHOE TOOL
Wesley Warren Broussard, 855 Euclid St., Beaumont, Tex.
Filed Feb. 25, 1957, Ser. No. 641,977
1 Claim. (Cl. 12—77.5)

This invention relates to new and useful improvements in a rotary shoe tool and is used as an attachment to the shaft of a shoe lathe for working leather and the like.

An object of the invention is to provide a rotary shoe tool adapted to be quickly attached and removed from the shaft end of a rotary shoe lathe and having flutes or grooves formed in the outer periphery of the body and running lengthwise of said body of said rotary shoe tool.

Another object of the invention is to provide a rotary shoe tool of the character described adapted to be fitted and rotated on the end of a shoe lathe.

A further object of the invention is to provide a rotary tool of the character described being elongated and reduced toward its outer end, preferably terminating in a smooth rounded off outer end portion.

A still further object of the invention is to provide a rotary shoe tool of the character described having deep grooves longitudinally disposed in the outer surfaces of said tool graduated to lesser depth and width toward the reduced smooth rounded off outer end of said tool.

These and other objects of the invention will in part be obvious and will in part be more fully disclosed in the specifications, the drawings of which show by way of illustration one embodiment of the invention, in which.

Figure 1:
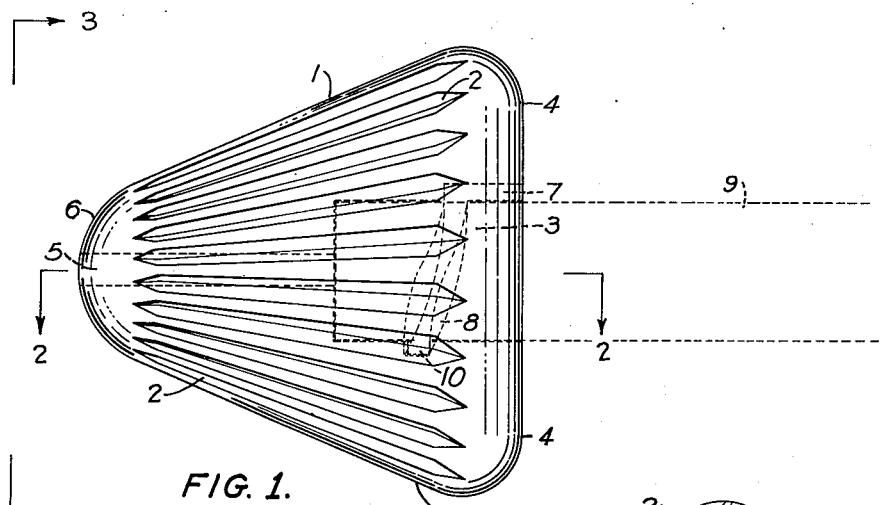
FIG. 1 is a side view in elevation showing the rotary shoe tool attached to the outer end of the rotatable shaft of a shoe lathe.
Figure 2:
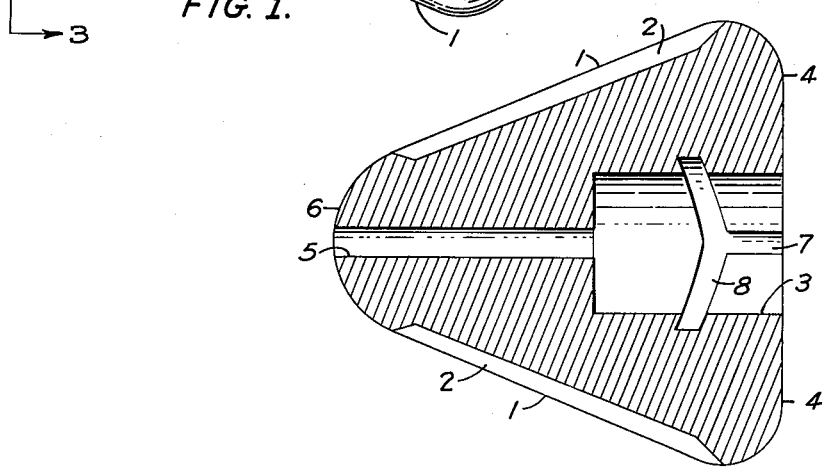
FIG. 2 is a sectional view taken on the line 2—2 of FIG. 1.
Figure 3:
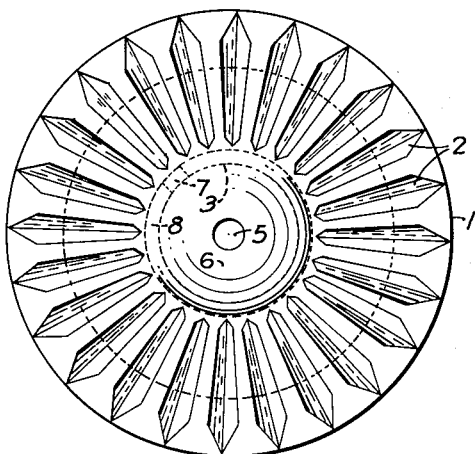
FIG. 3 is an end view taken on the line 3—3 of FIG. 1.

Referring to the accompanying drawings in which like numerals herein denote like numeraled parts therein in the various views, the rotary shoe tool is comprised of an elongated body 1 having deep flutes or grooves 2 formed lengthwise as indentures in the outer periphery of the body 1. A counter sunk hole 3 is formed in the body 1 with said flutes 2 preferably being progressively reduced in width and depth toward the smooth rounded off outer end 6 of said body 1. A counter sunk hole 3 is formed in the large end portion 4 of the body 1 and a smaller communicating hole 5 is drilled centrally through the remainder of the body 1 and extends from the counter sunk hole 3 through the small end 6 of the body 1. The counter sunk hole 3 is of a circumference to fit snugly over the outer end of rotatable shaft 9 of a shoe lathe. A key seat 7 is provided in the edge of the enlarged end 4 of the body 1 communicating with the inside of the counter sunk hole 3 and leads to a spiraled groove 8 of substantially the same depth of the key seat 7 whereby a single spline 10 on rotatable shoe lathe shaft 9 may travel in said key seat 7 and thence 180 degrees into said spiralled groove 8 by a twist of the hand in fitting said rotary shoe tool to the end of shaft 9 or said rotary shoe tool may be disengaged from said shaft 9 by turning said tool in a reverse manner so as to remove the same from said shaft 9 when desired.

It is understood that by attaching the tool to the end of said shaft in the above manner it is fastened to the shaft 9 of the lathe so that upon rotation of the lathe shaft the tool will rotate therewith. The smaller hole 5 will keep the tool cool from friction heat generated upon continuous use of the tool rotating against the leather being worked, and, also is provided to prevent debris from collecting in the counter sunk hole 3 in order to facilitate the attaching and detaching of said tool to said shaft free of debris since the counter sunk hole 3 is of snug fit with shaft 9.

In the operation of the rotary shoe tool it is used in connection with working down and smoothing the raised portions of stitched shoe soles or any raised portions caused on leather or other materials by stitching machines which sew shoe soles onto shoes or any place where two pieces of material are sewed together by a stitching machine. A stitching machine causes two parallel ridges or raised portions, one on each side of the stitch made in the material through which the stitch is sewed. These ridges present rough unfinished raised portions and in the case of a shoe sole when the shoe is used or walked on these rough raised unfinished portions caused by the stitching machine wear down quickly since they are raised above the surface of the shoe sole and permit dirt or other gritty substances to become embedded therebetween which cuts the threads of the stitches.

The rounded off smooth outer end portion 6 forms a nose whereby the ridges or raised portions of the leather may be fed into the shallow reduced end of the flutes adjacent to the rounded off smooth outer end portion 6 during rotation of said tool to neatly work down said raised portions or parallel ridges and not tear or cut the stitched threads where the flutes extend all the way to the end of other tools used in the art since the purpose of the latter is to burnish the edges of sole and heels of shoes, and if attempted to be used for working down parallel ridges the end of the flutes would dig in and cut the stitched threads and destroy very thing intended to be and which is protected by feeding the ridges into the smooth outer reduced end of the present tool and the indentures are also below the plane or surface of the unfluted portions of the tool which join with the smooth rounded off outer end portion of the tool, and the stitched threads are protected as the surface of the sole of the shoe bears and gauges the depth at which the edges of the flutes may engage and smooth down the parallel ridges running lengthwise with the stitched threads, whereas, an opened ended flute not having the smooth rounded off outer end portion joining the smooth surfaces between the flutes will allow the edges of the opened ended flutes to dig into and tear not only the ridges but the stitched threads, as well as, cut, mark and injure the surfaces of the whole surface coming into contact with the opened end edges of the flutes of burnishing tools whose functions are to burnish the edges of soles or holes of shoes or leather to be worked and not adapted for use with such surfaces contemplated with the present invention. Furthermore, these raised unfinished portions heretofore have been hammered down by the shoe cobbler in the shoe business and in so doing many times injures or breaks the threads which hold the shoe sole to the shoe. By the use of my invention these raised portions caused by the stitching machine are calendered and smoothed down to the level of the original material without injuring or breaking the threads of the stitches in a quick, economical and efficient manner by the cobbler simply pressing these raised portions lightly against the outer fluted surfaces of the rotating shoe tool in a quick deft operation that smoothes the raised portions without cutting or damaging the threads and makes a neat finished job far superior to that of pounding with a cobbler's hammer. The shoe tool may also be used for smoothing any surface such as the edge of the shoe sole by the quick and simple operation of lightly pressing the edge of the material to be finished against the outer grooved surfaces of the rotating shoe tool.

It is obvious that many changes in detail of construction and arrangement of the parts may be made without departing from the spirit and scope of the invention as set forth in the appended claim.

Having thus described the invention, what I claim as new and desire to secure by Letters Patent is:

A rotary shoe tool adapted to be attached to the end of a shaft and rotatable therewith, said tool being elongated in shape and continuously reduced toward the outer end and terminating in a reduced rounded off outer end portion and having lengthwise flutes formed in the outer surfaces of said tool and being progressively reduced in width and depth toward the outer end thereof with rounded surfaces therebetween, said flutes having outer side edges in the same plane as the rounded surfaces therebetween and converging downwardly and inwardly toward the reduced outer end portion of said tool, said flutes terminating adjacent to said outer rounded off end portion in the same plane so that the original surface of a thread stitched material may bear against said rounded off end portion and rounded surfaces between said flutes joined to said rounded off end portion to enable an operator to turn a thread stitched material around said outer rounded off end portion and feed said material into said flutes to work down the raised portions of a thread stitched material to cover the thread of the sewed stitches.

References Cited in the file of this patent
UNITED STATES PATENTS

| | | |
|---|---|---|
| 277,207 | Bourgeois | May 8, 1883 |
| 292,033 | Mitchell | Jan. 15, 1884 |
| 1,000,872 | Zemborski | Aug. 15, 1911 |